(12) United States Patent
Chu et al.

(10) Patent No.: US 10,234,607 B1
(45) Date of Patent: Mar. 19, 2019

(54) COMPOSITE PRISM, MANUFACTURING METHOD THEREOF, BACKLIGHT UNIT AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Hanqi Chu, Beijing (CN); Liangliang Zheng, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/010,576

(22) Filed: Jun. 18, 2018

(30) Foreign Application Priority Data

Jan. 2, 2018 (CN) .......................... 2018 1 0002832

(51) Int. Cl.
*F21V 8/00* (2006.01)
*G02B 5/04* (2006.01)

(52) U.S. Cl.
CPC ........... *G02B 5/045* (2013.01); *G02B 6/0053* (2013.01)

(58) Field of Classification Search
CPC ......... G02F 1/133605; G02F 1/133606; G02F 1/133611; G02F 1/133615; G02B 5/045; G02B 5/04; G02B 5/0808; G02B 6/0053; G02B 6/0055
See application file for complete search history.

(56) References Cited

U.S. PATENT DOCUMENTS

2018/0180794 A1* 6/2018 Harada ................ G02B 6/0053
2018/0274740 A1* 9/2018 Watanabe ................ F21K 9/20

* cited by examiner

*Primary Examiner* — Joseph L Williams
*Assistant Examiner* — Jose M Diaz
(74) *Attorney, Agent, or Firm* — Ladas & Parry LLP

(57) ABSTRACT

A composite prism, a manufacturing method thereof, a backlight unit and a display device are provided. The composite prism includes: a first prism sheet and a second prism sheet superimposed on each other, a part of a first surface of the second prism sheet near the first prism sheet contacting the first prism sheet; a gap being formed between the other part of the first surface and the first prism sheet; and a reflecting layer disposed on the surface of the second prism sheet contacting the first prism sheet and configured to allow light irradiated from the second prism sheet to the first prism sheet to travel through the gap.

10 Claims, 3 Drawing Sheets

COMPOSITE PRISM, MANUFACTURING METHOD THEREOF, BACKLIGHT UNIT AND DISPLAY DEVICE

CROSS REFERENCE TO RELATED APPLICATIONS

The application claims priority to the Chinese patent application No. 201810002832.5, filed on Jan. 2, 2018 with SIPO and entitled "Composite Prism, Manufacturing Method thereof, Backlight unit and Display Device", which is incorporated herein by reference in its entirety.

TECHNICAL FIELD

Embodiments of the present disclosure relate to a composite prism, a manufacturing method thereof, a backlight unit and a display device.

BACKGROUND

The conventional backlight structure adopts two independent prisms, namely an upper prism and a lower prism, however, along with the thinning tendency, the thickness of the two prisms is too large, so composite prisms are more and more favored in the backlight structure.

SUMMARY

Embodiments of the present disclosure provide a composite prism, a manufacturing method thereof, a backlight unit and a display device.

At least one embodiment of the present disclosure provides a composite prism, comprising: a first prism sheet and a second prism sheet superimposed on each other, a part of a first surface of the second prism sheet near the first prism sheet contacting the first prism sheet, and a gap being formed between the other part of the first surface and the first prism sheet; and a reflecting layer disposed between a surface of the second prism sheet contacting the first prism sheet and configured to allow light irradiated from the second prism sheet to the first prism sheet to travel through the gap.

For example, the composite prism further comprises an adhesive layer disposed on a surface of the first prism sheet near the second prism sheet and contacting the reflecting layer.

For example, the first prism sheet includes a first support plate and a plurality of first protrusions on a surface of the first support plate away from the second prism sheet; the second prism sheet includes a second support plate and a plurality of second protrusions on a surface of the second support plate near the first prism sheet; and the reflecting layer is disposed on the top of each of the second protrusions near the first prism sheet.

For example, the cross-section of each of the first protrusions and the second protrusions includes at least one shape of triangle, arc or trapezoid.

For example, material of the reflecting layer includes titanium dioxide, and silver.

At least one embodiment of the present disclosure provides backlight unit, comprising the composite prism.

At least one embodiment of the present disclosure provides a display device, comprising the backlight unit.

At least one embodiment of the present disclosure provides a method for manufacturing a composite prism, comprising: providing a first prism sheet and a second prism sheet; forming a reflecting layer on a part of a first surface of the second prism sheet; and superimposing the first prism sheet and the second prism sheet on each other. The first surface is near the first prism sheet; a gap is formed between the other part of the first surface and the first prism sheet; and the reflecting layer contacts the first prism sheet and allows light irradiated from the second prism sheet to the first prism sheet to travel through the gap.

For example, forming an adhesive layer on a surface of the first prism sheet near the second prism sheet, in which the adhesive layer contacts the reflecting layer.

For example, the reflecting layer and the adhesive layer are formed by a coating process.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Figure 1:
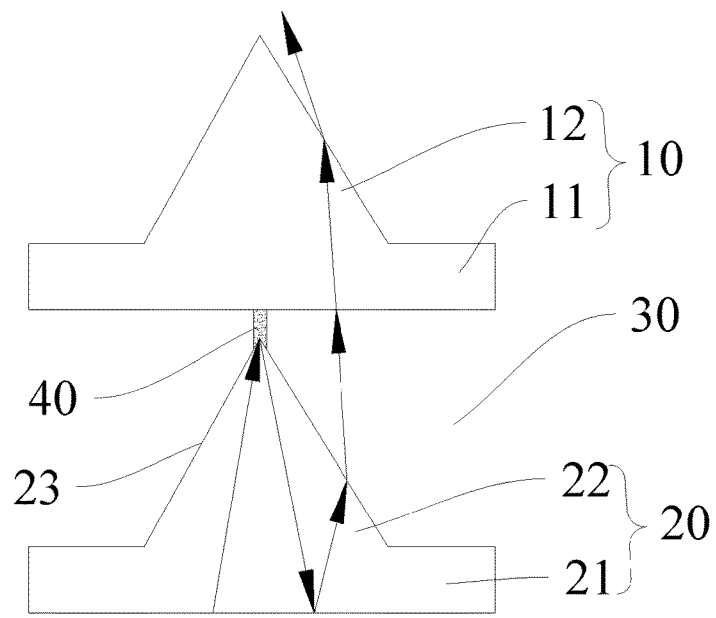
FIG. 1 is a schematically structural view of a composite prism provided by an embodiment of the present disclosure.

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

A composite prism is formed by the composition of two prisms, so that the substrate thickness of the two independent prisms is reduced and the overall thickness is reduced. Meanwhile, the thickness of the composite prism is larger than that of one prism, so the reliability is high. Moreover, the composite prism is convenient in assembly, so the process can be reduced, however, the composite prism still has many problems. The inventors noticed that: a partial surface of a second prism sheet in a composite prism directly contacts a first prism sheet or through an adhesive layer;

when the partial surface of the second prism sheet in the composite prism directly contacts the first prism sheet, light will not be reflected and refracted but directly enter into the first prism sheet when the light is irradiated to the first prism sheet from the partial surface of the second prism sheet, so no effective convergence effect is produced after the light travels through the composite prism sheets, and the brightening effect is not ideal; and when the partial surface of the second prism sheet in the composite prism contacts the first prism sheet through the adhesive layer, as the refractive index difference between the adhesive layer and the prism sheets is much smaller than the refractive index difference between the air and the prism sheets, and the thickness of the adhesive layer is very small in micrometer, the refraction process of the light in the adhesive layer can be basically ignored when the light is irradiated to the first prism sheet from the partial surface of the second prism sheet, that is to say, an optical path of the light irradiated to the first prism sheet through the adhesive layer may be considered as a straight line, no brightening effect will be achieved. However, the inventor has found that: the brightening effect can be achieved and the brightness can be improved by coating a reflecting layer on protrusions of the second prism sheet and reflecting back the light irradiated to the partial surface of the second prism sheet for reuse.

An embodiment of the present disclosure provides a composite prism. As shown in FIG. 1, the composite prism comprises: a first prism sheet 10 and a second prism sheet 20 superimposed on each other. A part of a first surface 23 of the second prism sheet 20 near the first prism sheet 10 contacts the first prism sheet, and a gap 30 is formed between the other part of the first surface 23 and the first prism sheet 10; and a reflecting layer 40 is disposed on a surface of the second prism sheet 20 contacting the first prism sheet 10 and configured to allow light irradiated from the second prism sheet 20 to the first prism sheet 10 to travel through the gap 30. When the light is irradiated from the second prism sheet to the first prism sheet through a surface part contacting the first prism sheet, the light will be reflected back by the reflecting layer, so that the light can be irradiated to the first prism sheet 10 from the second prism sheet again through the gap 30. In the process, the light enters the first prism sheet by refraction, so effective convergence can be produced, and the brightening effect can be achieved. Moreover, the light use efficiency is high.

It is noted that the first surface refers to a surface of the second prism sheet near the first prism sheet; the surface part of the first surface contacting the first prism sheet is a part of the first surface; and a surface part of the first surface not contacting the first prism sheet is the other part of the first surface.

In an embodiment of the present disclosure, the first prism sheet and the second prism sheet may, for instance, include base material and a plurality of prismatic peaks on the base material, however, the embodiment of the present disclosure is not limited thereto.

Figure 2:
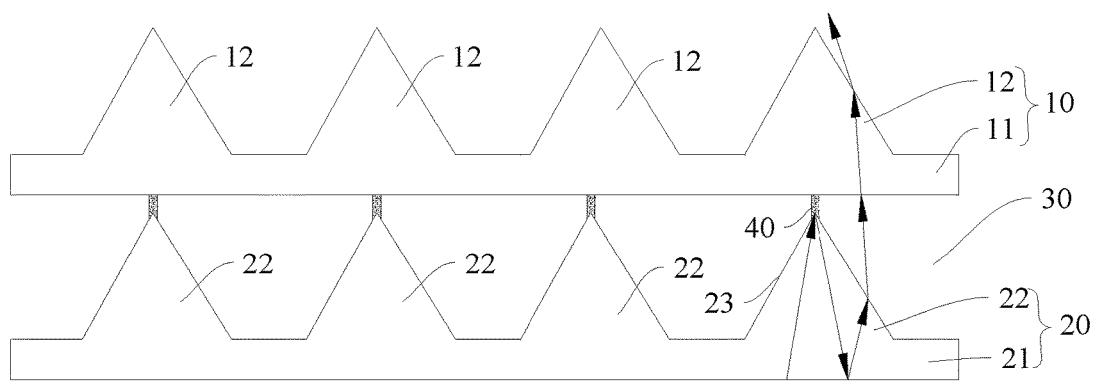
FIG. 2 is a schematically structural view of a composite prism provided by another embodiment of the present disclosure.

In an embodiment of the present disclosure, as shown in FIGS. 1 and 2, the first prism sheet 10 includes a first support plate 11 and a plurality of first protrusions 12 disposed on a surface of the first support plate 11 away from the second prism sheet 20. The second prism sheet 20 includes a second support plate 21 and a plurality of second protrusions 22 disposed on a surface of the second support plate 21 near the first prism sheet 10. A reflecting layer 40 is disposed on the top of each of the second protrusions 22 near the first prism sheet 10. The support plate 21 support provides good supporting to the protrusions 22, so that the stability of the composite prism can be improved. By the arrangement of the protrusions, the light can be converged within a certain range of angle, so effective brightening effect can be achieved.

In an embodiment of the present disclosure, to better improve the light use efficiency and the brightness, the shape of the first protrusions and the second protrusions is towerlike. In some embodiments of the present disclosure, the cross-section of each of the first protrusions and the second protrusions includes at least one shape of triangle (description is given in the accompanying drawings with reference to the triangle shape as an example), arc or trapezoid, so the brightness and the light use efficiency can be well improved.

In an embodiment of the present disclosure, the material of the reflecting layer is a material with high reflectivity. In some embodiments of the present disclosure, the material of the reflecting layer includes titanium dioxide, silver or the like, so that the light reflectivity is high and the material resource is wide, however, the embodiment of the present disclosure is not limited thereto.

Figure 3:
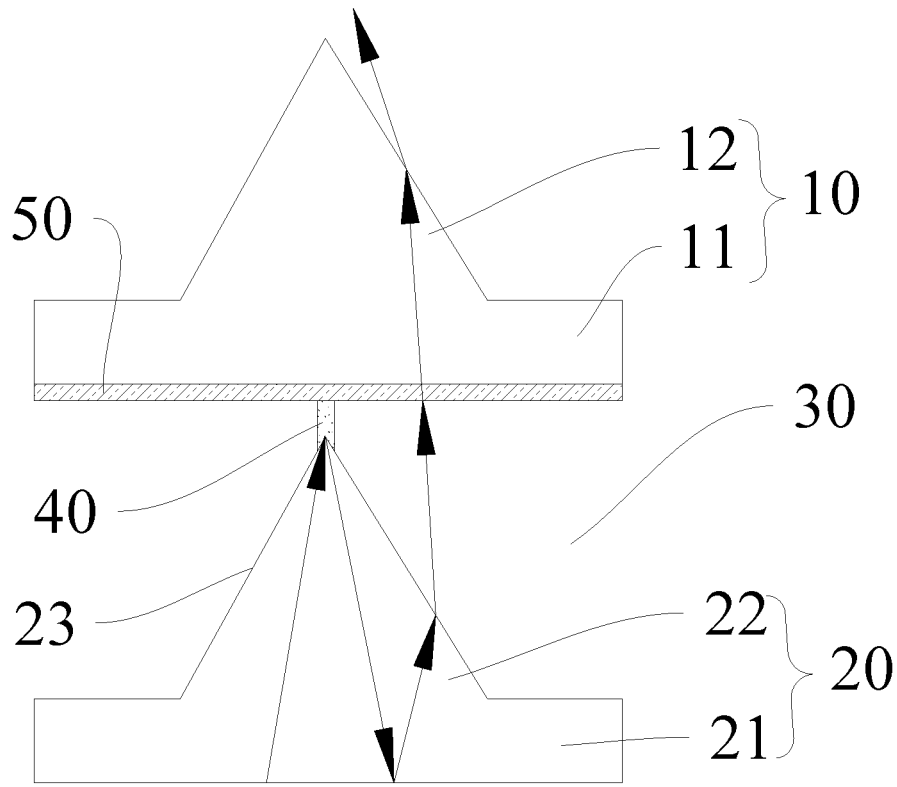
FIG. 3 is a schematically structural view of a composite prism provided by yet another embodiment of the present disclosure.

In an embodiment of the present disclosure, to further improve the stability of the composite prism, as shown in FIG. 3, the composite prism further comprises: an adhesive layer 50 disposed on a surface of the first prism sheet 10 near the second prism sheet 20 and contacting the reflecting layers 40. As the first prism sheet 10 and the second prism sheet 20 are bonded together through the adhesive layer 50, the stability of the composite prism can be well guaranteed, and the use stability of the composite prism can be improved.

In an embodiment of the present disclosure, the material of the adhesive layer has good adhesion, so that the stability of the composite prism can be well guaranteed, and the use stability of the composite prism can be improved. For instance, the material of the adhesive layer includes UV gel, for example.

The embodiments of the present disclosure also provide a backlight unit, which comprises the composite prism. Correspondingly, the backlight unit has high light utilization efficiency and provides high-brightness backlight. In addition, the backlight unit has all the advantages and characteristics described above, so no further description will be given here.

It should be understood by a person of ordinary skill in the art that the backlight unit comprises the foregoing composite prism and other structures and components required by a backlight unit, for example, structures and components, such as a light guide plate (LGP), a diffuser plate and a light source.

The embodiments of the present disclosure also provide a display device, which comprises the foregoing backlight unit. Correspondingly, the display device has good use properties. In addition, the display device has all of the advantages and characteristics described above, so no further description will be repeated here.

The display device may be any product or component having display function, which includes but is not limited to a mobile phone, a tablet PC, a computer display screen, a game console, a TV, a display screen, a wearable device, or other household appliances with display function.

It should be understood by a person of skill in the art that: besides the foregoing backlight unit, the display device provided by the present disclosure may further comprise necessary structures and components for a display device. For example, for a mobile phone, besides the backlight unit provided by the present disclosure, the mobile phone may further comprise other structures and components for a mobile phone, for example, a touch screen, a housing, a CPU, a camera module, a fingerprint recognition module and a sound processing system. No further description will be repeated here.

Figure 4:
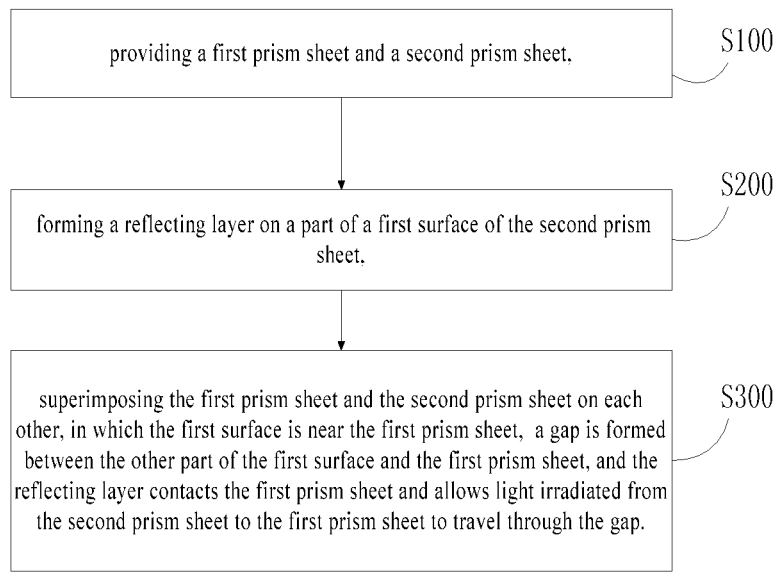
FIG. 4 is a flow chart of a method for manufacturing a composite prism provided by an embodiment of the present disclosure.

The embodiments of the present disclosure also provide a method for manufacturing a composite prism. As shown in FIG. 4, the method comprises following operations.

S100: providing a first prism sheet and a second prism sheet.

S200: forming a reflecting layer on a part of a first surface of the second prism sheet.

In an embodiment of the present disclosure, the method of forming the reflecting layer may, for instance, be formed by coating, deposition or the like, but the embodiment of the present disclosure is not limited thereto. The forming of the reflecting layer by the above processes is easy to operate and favorable for industrial production.

S300: superimposing the first prism sheet and the second prism sheet on each other, in which a first surface of the second prism sheet is near the first prism sheet; a gap is formed between the other part of the first surface of the second prism sheet and the first prism sheet; and the reflecting layer contacts the first prism sheet and allows light irradiated from the second prism sheet to the first prism sheet to travel through the gap.

In an embodiment of the present disclosure, the above process is easy to operate and favorable for industrial production. In the composite prism manufactured by the method, when light is irradiated from the second prism sheet to the first prism sheet through a surface part contacting the first prism sheet, the light will be reflected back by the reflecting layer and be irradiated to the first prism sheet from the second prism sheet again through the gap. During this procedure, the light enters the first prism sheet by refraction, so effective convergence can be produced, and the brightening effect can be achieved. Moreover, the light use efficiency is high.

In an embodiment of the present disclosure, the method may be used for manufacturing the foregoing composite prism, in which the requirements on the first prism sheet, the second prism sheet and the reflecting layer are the same as those described above, so no further description will be repeated here.

Figure 5:
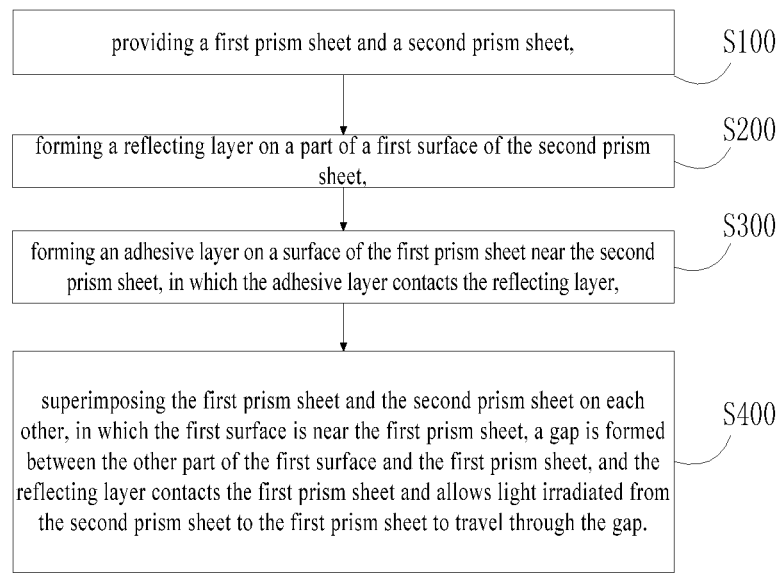
FIG. 5 is a flow chart of a method for manufacturing a composite prism provided by yet another embodiment of the present disclosure.

In an embodiment of the present disclosure, as shown in FIG. 5, for instance, the method may further comprise: S400: forming an adhesive layer on a surface of the first prism sheet near the second prism sheet, in which the adhesive layer contacts the reflecting layer.

In an embodiment of the present disclosure, the adhesive layer may be formed by, for instance, a coating process, however, the embodiment of the present disclosure is not limited thereto. In this way, the method is easy to operate and favorable for industrial production.

In an embodiment of the present disclosure, the material of the adhesive layer has good adhesion, for instance, it may be UV gel, however, the embodiment of the present disclosure is not limited thereto. By using the adhesive layer, the stability of the composite prism can be well guaranteed, and the use stability of the composite prism can be improved.

The described features, structures, materials or characteristics in the description may be combined in any suitable manner in any one or more embodiments or examples. In addition, without conflict with each other, different embodiments or examples or the characteristics of different embodiments or examples described in the description may be combined in use by a person of ordinary skill in the art.

What is claimed is:

1. A composite prism, comprising:
   a first prism sheet and a second prism sheet superimposed on each other, wherein a part of a first surface of the second prism sheet near the first prism sheet contacts the first prism sheet, and a gap is formed between the other part of the first surface and the first prism sheet; and
   a reflecting layer disposed between a surface of the second prism sheet contacting the first prism sheet and configured to allow light irradiated from the second prism sheet to the first prism sheet to travel through the gap.

2. The composite prism according to claim 1, further comprising:
   an adhesive layer disposed on a surface of the first prism sheet near the second prism sheet and contacting the reflecting layer.

3. The composite prism according to claim 1, wherein the first prism sheet includes a first support plate and a plurality of first protrusions on a surface of the first support plate away from the second prism sheet;
   the second prism sheet includes a second support plate and a plurality of second protrusions on a surface of the second support plate near the first prism sheet; and
   the reflecting layer is disposed on the top of each of the second protrusions near the first prism sheet.

4. The composite prism according to claim 3, wherein the cross-section of each of the first protrusions and the second protrusions includes at least one shape of triangle, arc or trapezoid.

5. The composite prism according to claim 1, wherein material of the reflecting layer includes titanium dioxide and silver.

6. A backlight unit, comprising the composite prism according to claim 1.

7. A display device, comprising the backlight unit according to claim 6.

8. A method for manufacturing a composite prism, comprising:
   providing a first prism sheet and a second prism sheet;
   forming a reflecting layer on a part of a first surface of the second prism sheet; and
   superimposing the first prism sheet and the second prism sheet on each other,
   wherein the first surface is near the first prism sheet; a gap is formed between the other part of the first surface and the first prism sheet; and the reflecting layer contacts the first prism sheet and allows light irradiated from the second prism sheet to the first prism sheet to travel through the gap.

9. The method according to claim 8, further comprising:
   forming an adhesive layer on a surface of the first prism sheet near the second prism sheet, in which the adhesive layer contacts the reflecting layer.

10. The method according to claim 9, wherein the reflecting layer and the adhesive layer are formed by a coating process.

* * * * *